(12) United States Patent
Nakazawa (10) Patent No.: US 12,519,120 B2
(45) Date of Patent: Jan. 6, 2026

(54) FUEL CELL AND METHOD FOR MANUFACTURING FUEL CELL

(71) Applicant: TOYOTA JIDOSHA KABUSHIKI KAISHA, Toyota (JP)

(72) Inventor: Satoshi Nakazawa, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 511 days.

(21) Appl. No.: 18/301,647

(22) Filed: Apr. 17, 2023

(65) Prior Publication Data

US 2023/0395834 A1 Dec. 7, 2023

(30) Foreign Application Priority Data

Jun. 3, 2022 (JP) ................................. 2022-090914

(51) Int. Cl.
*H01M 8/1004* (2016.01)
*H01M 4/88* (2006.01)
*H01M 8/0273* (2016.01)

(52) U.S. Cl.
CPC ....... *H01M 8/1004* (2013.01); *H01M 4/8807* (2013.01); *H01M 8/0273* (2013.01)

(58) Field of Classification Search
CPC ............. H01M 8/1004; H01M 4/8807; H01M 8/0273; H01M 2008/1095; H01M 8/0284; H01M 8/023; H01M 8/0258; Y02E 60/50; Y02P 70/50
See application file for complete search history.

(56) References Cited

U.S. PATENT DOCUMENTS

| 2019/0006696 A1 | 1/2019 | Yoshimoto et al. |
| 2021/0288338 A1 | 9/2021 | Nonoyama et al. |

FOREIGN PATENT DOCUMENTS

| JP | 2006216294 A | 8/2006 |
| JP | 2016170960 A | 9/2016 |
| JP | 2019016586 A | 1/2019 |
| JP | 2021144854 A | 9/2021 |

*Primary Examiner* — Helen Oi K Conley
(74) *Attorney, Agent, or Firm* — Hunton Andrews Kurth LLP (57) ABSTRACT

A fuel cell includes a membrane electrode assembly, a first gas diffusion layer, a second gas diffusion layer, a support, and a cover sheet. There is a space having a distance $L_A$ between an end face of the support and an end face of the membrane electrode assembly. The expression of $E>0.048\times L_A^4/t^3$ is satisfied, where E is the elastic modulus of the cover sheet, and t is the thickness of the cover sheet. The reduction rate of voids in at least a part of a portion of the first gas diffusion layer under which the cover sheet is located with respect to voids in a portion of the first gas diffusion layer under which the cover sheet is not located is 5% or more and 25% or less.

3 Claims, 7 Drawing Sheets

FUEL CELL AND METHOD FOR MANUFACTURING FUEL CELL

CROSS-REFERENCE TO RELATED APPLICATION

This application claims priority to Japanese Patent Application No. 2022-090914 filed on Jun. 3, 2022, incorporated herein by reference in its entirety.

BACKGROUND

1. Technical Field

The present disclosure relates to fuel cells and methods for manufacturing a fuel cell.

2. Description of Related Art

Japanese Unexamined Patent Application Publication No. 2021-144854 (JP 2021-144854 A) discloses a structure in which an adhesive and a cover sheet are located so as to connect a support frame and a membrane electrode assembly and a gas diffusion layer is located over the cover sheet. Japanese Unexamined Patent Application Publication No. 2006-216294 (JP 2006-216294 A) discloses that the thickness of each plate member is determined so that the compressibility of a contact portion of a gas diffusion layer with a separator is a predetermined value. Japanese Unexamined Patent Application Publication No. 2016-170960 (JP 2016-170960 A) discloses that the Young's modulus of a material forming a protruding portion is lower than that of a material forming a support frame body. Japanese Unexamined Patent Application Publication No. 2019-16586 (JP 2019-16586 A) discloses that a frame has a Young's modulus of 1 GPa or more.

SUMMARY

In the techniques described above, when a cover sheet is placed, a membrane electrode assembly, a gas diffusion layer, and the cover sheet may be damaged or poor sealing may occur. Such a damage or poor sealing may lead to leakage of reactive gases.

The present disclosure provides a fuel cell that can reduce the possibility of damage to a membrane electrode assembly and a gas diffusion layer even when a cover sheet is placed at the junction between a support and the membrane electrode assembly.

A fuel cell according to an aspect of the present disclosure includes: a membrane electrode assembly including a first catalyst layer, a second catalyst layer, and an electrolyte membrane located between the first catalyst layer and the second catalyst layer; a first gas diffusion layer located on the first catalyst layer, at least a part of an outer peripheral end portion of the first gas diffusion layer protruding beyond an outer peripheral edge of the membrane electrode assembly; a second gas diffusion layer located on the second catalyst layer; a support located around the membrane electrode assembly; and a cover sheet located so as to connect either or both of the electrolyte membrane and the first catalyst layer and the support. There is a space having a distance $L_A$ (mm) between an end face of the support and an end face of the membrane electrode assembly. The following expression is satisfied, $$E > 0.048 \times L_A^4 / t^3$$

where E (MPa) is an elastic modulus of the cover sheet, and t (mm) is a thickness of the cover sheet. A reduction rate of voids in at least a part of a portion of the first gas diffusion layer under which the cover sheet is located with respect to voids in a portion of the first gas diffusion layer under which the cover sheet is not located is 5% or more and 25% or less.

The above fuel cell may further include a set of separators sandwiching the first gas diffusion layer, the membrane electrode assembly, and the second gas diffusion layer. The support may seal between the set of separators.

A method for manufacturing a fuel cell according to an aspect of the present disclosure includes: placing a cover sheet on a membrane electrode assembly and a support; and placing a first gas diffusion layer on the cover sheet and the membrane electrode assembly. The membrane electrode assembly includes a first catalyst layer, a second catalyst layer, and an electrolyte membrane located between the first catalyst layer and the second catalyst layer. The support is located around the membrane electrode assembly, and a space having a distance $L_A$ (mm) is provided between the support and an end face of the membrane electrode assembly. The following expression is satisfied, $$E > 0.048 \times L_A^4 / t^3$$

where E (MPa) is an elastic modulus of the cover sheet, and t (mm) is a thickness of the cover sheet. When placing the cover sheet on the membrane electrode assembly and the support, the cover sheet is placed so as to connect either or both of the electrolyte membrane and the first catalyst layer and the support. When placing the first gas diffusion layer on the cover sheet and the membrane electrode assembly, the first gas diffusion layer is pressed in such a manner that a reduction rate of voids in at least a part of a portion of the first gas diffusion layer under which the cover sheet is located with respect to voids in a portion of the first gas diffusion layer under which the cover sheet is not located is 5% or more and 25% or less.

According to the present disclosure, the possibility of damage to a membrane electrode assembly and a gas diffusion layer can be reduced even when a cover sheet is placed at the junction between a support and the membrane electrode assembly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Power Generation Unit Cell

Figure 1:
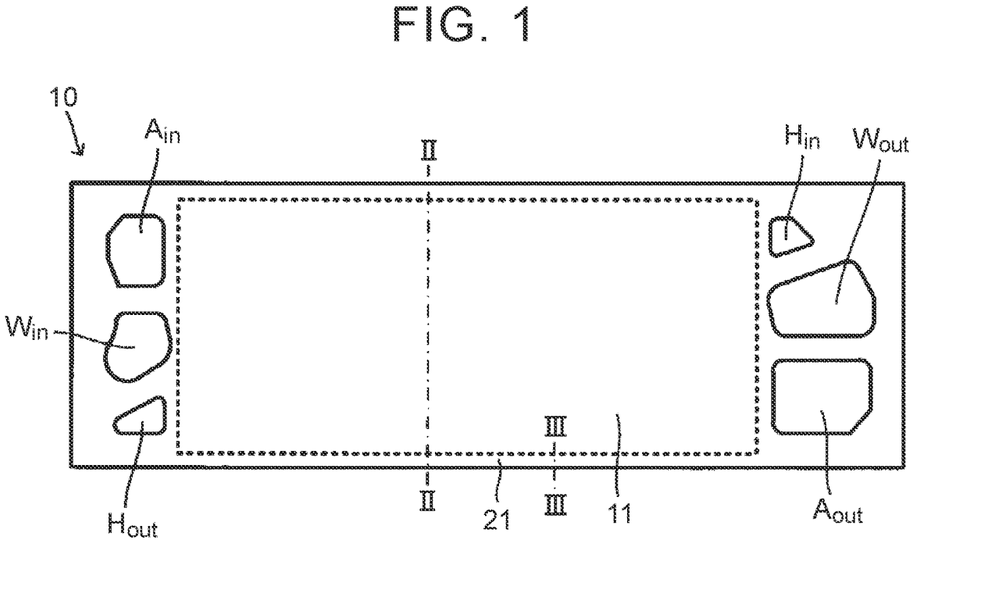
FIG. 1 is a plan view of a power generation unit cell 10.
Figure 2:
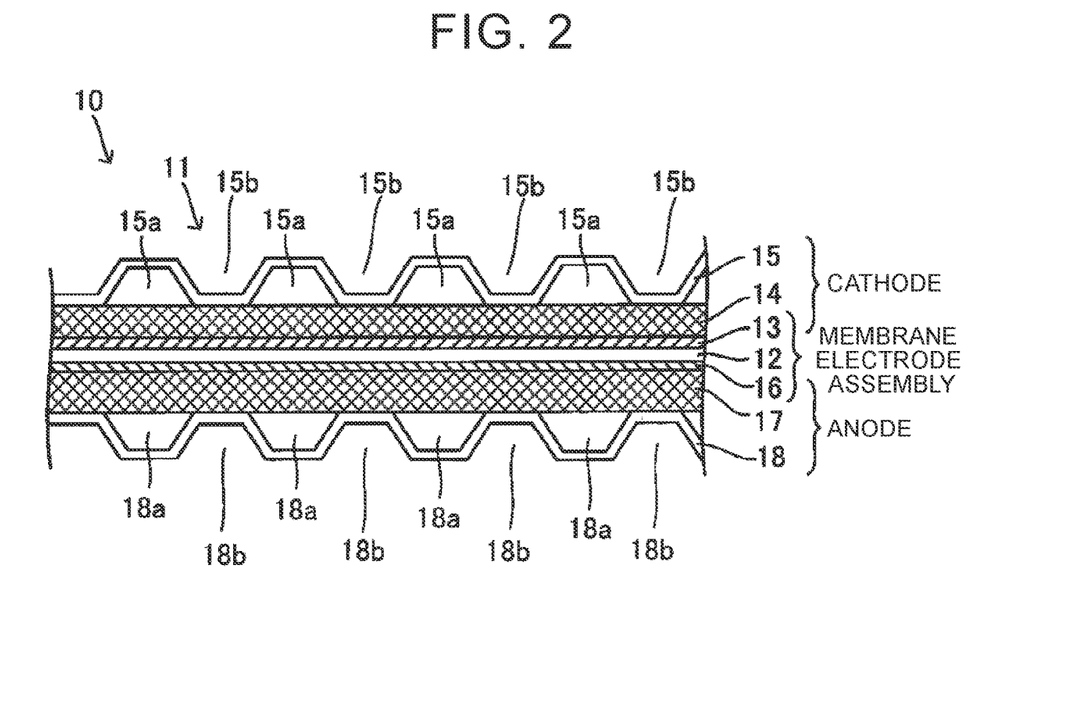
FIG. 2 is a sectional view of a power generation portion 11, illustrating a layer configuration of the power generation portion 11.
Figure 3:
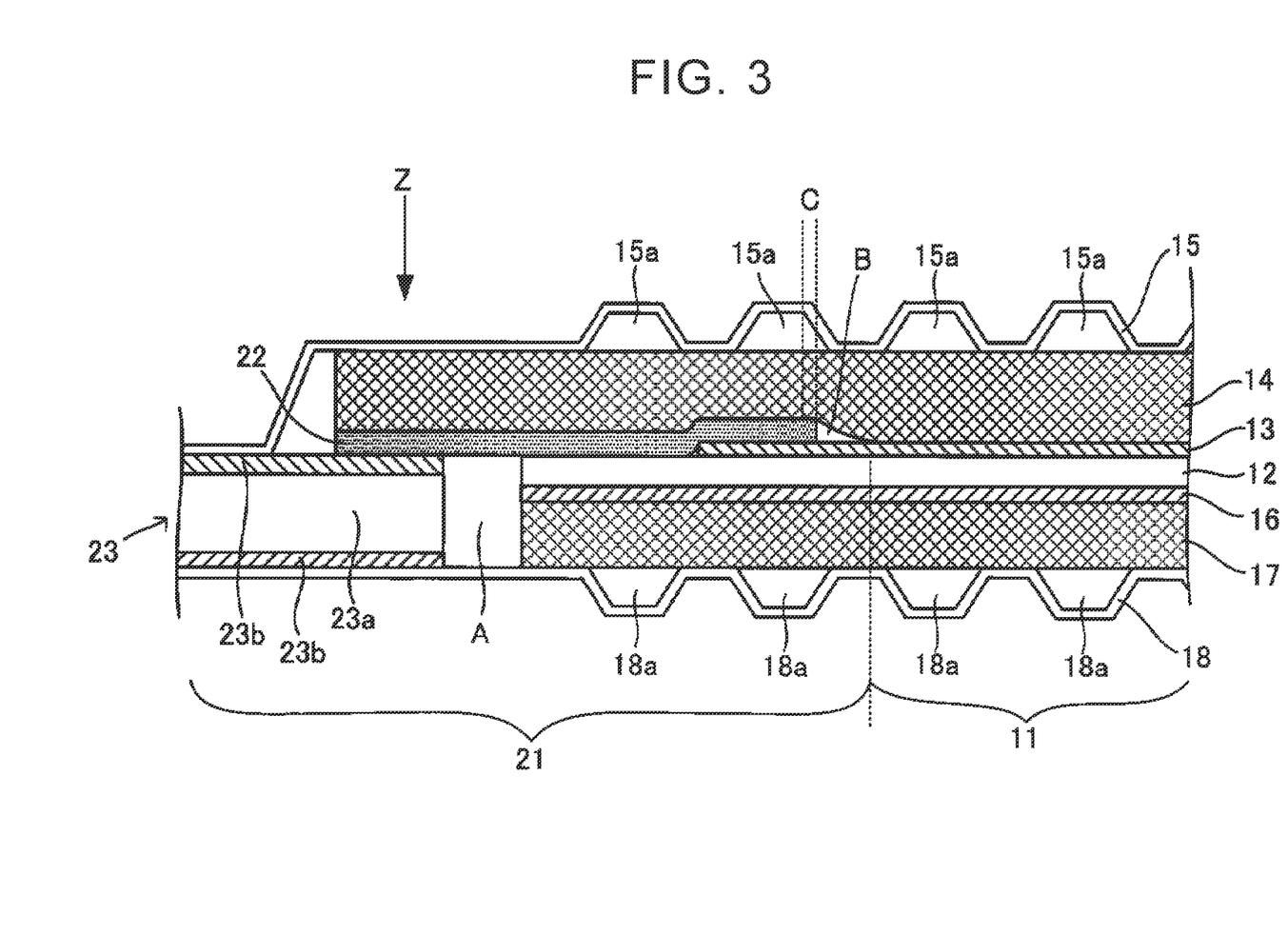
FIG. 3 is a sectional view of an outer peripheral portion 21, illustrating a layer configuration of the outer peripheral portion 21.

FIGS. 1 to 3 illustrate a power generation unit cell 10 according to an embodiment. The power generation unit cell 10 is a unit element for a fuel cell to generate electricity when supplied with hydrogen and oxygen (air). A plurality of such power generation unit cells 10 is stacked to form a fuel cell. FIG. 1 is a plan view of the power generation unit cell 10. FIG. 2 illustrates the configuration of layers in a power generation portion 11 of the power generation unit cell 10. FIG. 3 illustrates the configuration of layers in an outer peripheral portion 21 of the power generation unit cell 10.

1.1. Power Generation Portion

The power generation portion 11 is, for example, a portion that contributes to power generation as shown enclosed by a dashed line in FIG. 1. The power generation portion 11 is composed of a stack of a plurality of layers, as shown by the layer configuration in the power generation portion 11 in FIG. 2 (part of a section along line II-II in FIG. 1). One side of the power generation portion 11 of the power generation unit cell 10 located above an electrolyte membrane 12 in FIG. 2 is a cathode (oxygen supply side), and the other side of the power generation portion 11 of the power generation unit cell 10 located below the electrolyte membrane 12 in FIG. 2 is an anode (hydrogen supply side). The cathode includes a cathode catalyst layer 13 (first catalyst layer), a cathode gas diffusion layer 14 (first gas diffusion layer), and a cathode separator 15 (first separator) that are stacked in this order from the electrolyte membrane 12 side. The anode includes an anode catalyst layer 16 (second catalyst layer), an anode gas diffusion layer 17 (second gas diffusion layer), and an anode separator 18 (second separator) in this order from the electrolyte membrane 12 side. A stack of the electrolyte membrane 12, the cathode catalyst layer 13, and the anode catalyst layer 16 is sometimes called a membrane electrode assembly. A typical thickness of the membrane electrode assembly is around 0.4 mm. A typical thickness of the power generation unit cell 10 in the power generation portion 11 is around 1.3 mm. For example, each layer is as follows.

1.1.1. Electrolyte Membrane

The electrolyte membrane 12 is a solid polymer thin membrane that exhibits satisfactory proton conductivity in wet conditions. The electrolyte membrane 12 is, for example, a fluorine ion exchange membrane. For example, a carbon-fluorine polymer can be used as the electrolyte membrane 12. A specific example of the carbon-fluorine polymer is a perfluoroalkyl sulfonic acid polymer (Nafion (registered trademark)). The thickness of the electrolyte membrane 12 may be, but is not particularly limited to, 200 μm or less, preferably 100 μm or less, more preferably 50 μm or less.

1.1.2. Cathode Catalyst Layer

The cathode catalyst layer 13 is a layer containing a catalyst metal supported on a carrier. Examples of the catalyst metal include platinum (Pt), palladium (Pd), rhodium (Rh), and alloys containing these. Examples of the carrier include carbon carriers, more specifically, carbon particles of glassy carbon, carbon black, activated carbon, coke, natural graphite, and artificial graphite.

1.1.3. Anode Catalyst Layer

Like the cathode catalyst layer 13, the anode catalyst layer 16 is also a layer containing a catalyst metal supported on a carrier. Examples of the catalyst metal include Pt, Pd, Rh, and alloys containing these. Examples of the carrier include carbon carriers, more specifically, carbon particles of glassy carbon, carbon black, activated carbon, coke, natural graphite, and artificial graphite.

1.1.4. Cathode Gas Diffusion Layer

In the present embodiment, the cathode gas diffusion layer 14 is a layer of, for example, an electrically conductive porous material. More specific examples of the cathode gas diffusion layer 14 include carbon porous materials (such as carbon paper, carbon cloth, and glassy carbon) and metal porous materials (metal mesh and metal foam). The cathode gas diffusion layer 14 may be provided with a microporous layer (MPL), as needed. The MPL is a thin film in the form of a coating applied to the cathode catalyst layer 13 side of the cathode gas diffusion layer 14. The MPL is water repellent or hydrophilic, as needed, and has a function to adjust moisture. The MPL also serves to prevent fuzz etc. on a carbon porous material from sticking into the electrolyte membrane 12. Typically, the MPL mainly contains a water-repellent resin such as polytetrafluoroethylene (PTFE) and an electrically conductive material such as carbon black.

The thickness of the cathode gas diffusion layer 14 in the power generation portion 11 is preferably 50 μm or more and 250 μm or less. When the thickness of the cathode gas diffusion layer 14 in the power generation portion 11 is greater than 250 μm, the electronic resistance increases. When the thickness of the cathode gas diffusion layer 14 in the power generation portion 11 is less than 50 μm, the cathode gas diffusion layer 14 may not be flexible enough to obtain a uniform surface pressure in the power generation portion 11. More specifically, a surface pressure of 0.2 MPa or more and 2 MPa or less is applied to the power generation portion 11, and spring properties (elasticity) of the cathode gas diffusion layer 14 are used to keep the surface pressure in the power generation portion 11 constant. As will be described later, the thickness of an overlapping portion of the cathode gas diffusion layer 14 with the cover sheet 22 as viewed in plan is reduced by an amount in the range of 5 μm or more and 50 μm or less to reduce voids (void reduction rate is 5% or more and 25% or less) and thus reduce a space B. Therefore, the cathode gas diffusion layer 14 needs to have a certain thickness.

1.1.5. Anode Gas Diffusion Layer

The anode gas diffusion layer 17 is a layer of, for example, an electrically conductive porous material. More specific examples of the anode gas diffusion layer 17 include carbon porous materials (such as carbon paper, carbon cloth, and glassy carbon) and metal porous materials (metal mesh and metal foam).

The thickness of the anode gas diffusion layer 17 in the power generation portion 11 is preferably 50 μm or more and 250 μm or less. When the thickness of the anode gas diffusion layer 17 in the power generation portion 11 is greater than 250 μm, the electronic resistance increases. When the thickness of the anode gas diffusion layer 17 in the power generation portion 11 is less than 50 μm, the anode gas diffusion layer 17 may not be flexible enough to obtain a uniform surface pressure in the power generation portion 11. More specifically, a surface pressure of 0.2 MPa or more and 2 MPa or less is applied to the power generation portion 11, and spring properties (elasticity) of the anode gas diffusion layer 17 are used to keep the surface pressure in the power generation portion 11 constant. As will be described later, in some cases, the thickness of an overlapping portion of the anode gas diffusion layer 17 with the cover sheet 22 as viewed in plan is reduced by an amount in the range of 5 μm or more and 50 μm or less to reduce voids (void reduction rate is 5% or more and 25% or less) and thus reduce the space B. Therefore, the anode gas diffusion layer 17 needs to have a certain thickness.

1.1.6. Cathode Separator

The cathode separator 15 is a member that supplies reactive gas (air in the present embodiment) to the cathode gas diffusion layer 14, and has a plurality of grooves 15a on its surface facing the cathode gas diffusion layer 14. These grooves 15a serve as reactive gas channels. The shape of the grooves 15a is not particularly limited as long as the reactive gas can be appropriately supplied to the cathode gas diffusion layer 14. For example, the grooves 15a are in the form of corrugations of a corrugated plate member as in the present embodiment. A typical thickness of the plate member is 0.1 mm or more and 0.2 mm or less, and a typical height of the corrugations of the plate member is around 0.5 mm. The cathode separator 15 has grooves 15b on the opposite side from the grooves 15a. Each groove 15b is formed between adjacent ones of the grooves 15a. The grooves 15b serve as coolant channels.

As can be seen from FIG. 1, the cathode separator 15 has an air inlet $A_{in}$, a coolant inlet $W_{in}$, and a hydrogen outlet $H_{out}$ at positions outside the power generation portion 11 in a portion extended from the power generation portion 11, namely in one end portion in the direction in which the grooves 15a, 15b extend. The cathode separator 15 further has an air outlet $A_{out}$, a coolant outlet $W_{out}$, and a hydrogen inlet $H_{in}$ at positions outside the power generation portion 11 in a portion extended from the power generation portion 11, namely in the other end portion in the direction in which the grooves 15a, 15b extend. The grooves 15a communicate with the air inlet $A_{in}$ and the air outlet $A_{out}$. The grooves 15b communicate with the coolant inlet $W_{in}$ and the coolant outlet $W_{out}$.

The cathode separator 15 may be made of any material that can be used as a separator for a power generation unit cell, and may be made of a gas-impermeable, electrically conductive material. Examples of such a material include gas-impermeable dense carbon produced by compressing carbon, and press-formed metal plates.

1.1.7. Anode Separator

The anode separator 18 is a member that supplies reactive gas (hydrogen) to the anode gas diffusion layer 17, and has a plurality of grooves 18a on its surface facing the anode gas diffusion layer 17. These grooves 18a serve as reactive gas channels. The shape of the grooves 18a is not particularly limited as long as the reactive gas can be appropriately supplied to the anode gas diffusion layer 17. For example, the grooves 18a are in the form of corrugations of a corrugated plate member as in the present embodiment. A typical thickness of the plate member is 0.1 mm or more and 0.2 mm or less, and a typical height of the corrugations of the plate member is around 0.4 mm. The anode separator 18 has grooves 18b on the opposite side from the grooves 18a. Each groove 18b is formed between adjacent ones of the grooves 18a. The grooves 18b serve as coolant channels.

As can be seen from FIG. 1, the anode separator 18 has an air inlet $A_{in}$, a coolant inlet $W_{in}$, and a hydrogen outlet $H_{out}$ at positions outside the power generation portion 11 in a portion extended from the power generation portion 11, namely in one end portion in the direction in which the grooves 18a, 18b extend. The anode separator 18 further has an air outlet $A_{out}$, a coolant outlet $W_{out}$, and a hydrogen inlet $H_{in}$ at positions outside the power generation portion 11 in a portion extended from the power generation portion 11, namely in the other end portion in the direction in which the grooves 18a, 18b extend. The grooves 18a communicate with the hydrogen inlet $H_{in}$ and the hydrogen outlet $H_{out}$. The grooves 18b communicate with the coolant inlet $W_{in}$ and the coolant outlet $W_{out}$.

The anode separator 18 may be made of any material that can be used as a separator for a power generation unit cell, and may be made of a gas-impermeable, electrically conductive material. Examples of such a material include gas-impermeable dense carbon produced by compressing carbon, and press-formed metal plates.

1.1.8. Power Generation by Power Generation Portion

The power generation unit cell 10 described above generates electricity as follows. Hydrogen supplied from the hydrogen inlet $H_{in}$ to the grooves 18a of the anode separator 18 passes through the anode gas diffusion layer 17 and is decomposed into protons ($H^+$) and electrons ($e^-$) in the anode catalyst layer 16. The protons reach the cathode catalyst layer 13 through the electrolyte membrane 12, and the electrons reach the cathode catalyst layer 13 through a conductive wire leading to the outside. The remaining hydrogen is discharged from the hydrogen outlet $H_{out}$. Oxygen (air) is supplied from the air inlet $A_{in}$ to the cathode catalyst layer 13 through the grooves 15a of the cathode separator 15 and the cathode gas diffusion layer 14. Water ($H_2O$) is produced by the protons, electrons, and oxygen in the cathode catalyst layer 13. The produced water and the remaining air pass through the cathode gas diffusion layer 14, reach the grooves 15a of the cathode separator 15, and are discharged from the air outlet $A_{out}$. In the power generation unit cell 10, the flow of the electrons through the conductive wire extending from the anode catalyst layer 16 to the outside is used as a current.

The power generation unit cells 10 are stacked such that the cathode separator 15 of one of adjacent ones of the power generation unit cells 10 is located under the anode separator 18 of the other power generation unit cell 10. The grooves 15b of the cathode separator 15 and the grooves 18b of the anode separator 18 thus form coolant channels. A coolant is supplied from the coolant inlet $W_{in}$ to the coolant channels. The supplied coolant cools the power generation unit cell 10 and is discharged from the coolant outlet $W_{out}$.

1.2. Outer Peripheral Portion

Figure 4:
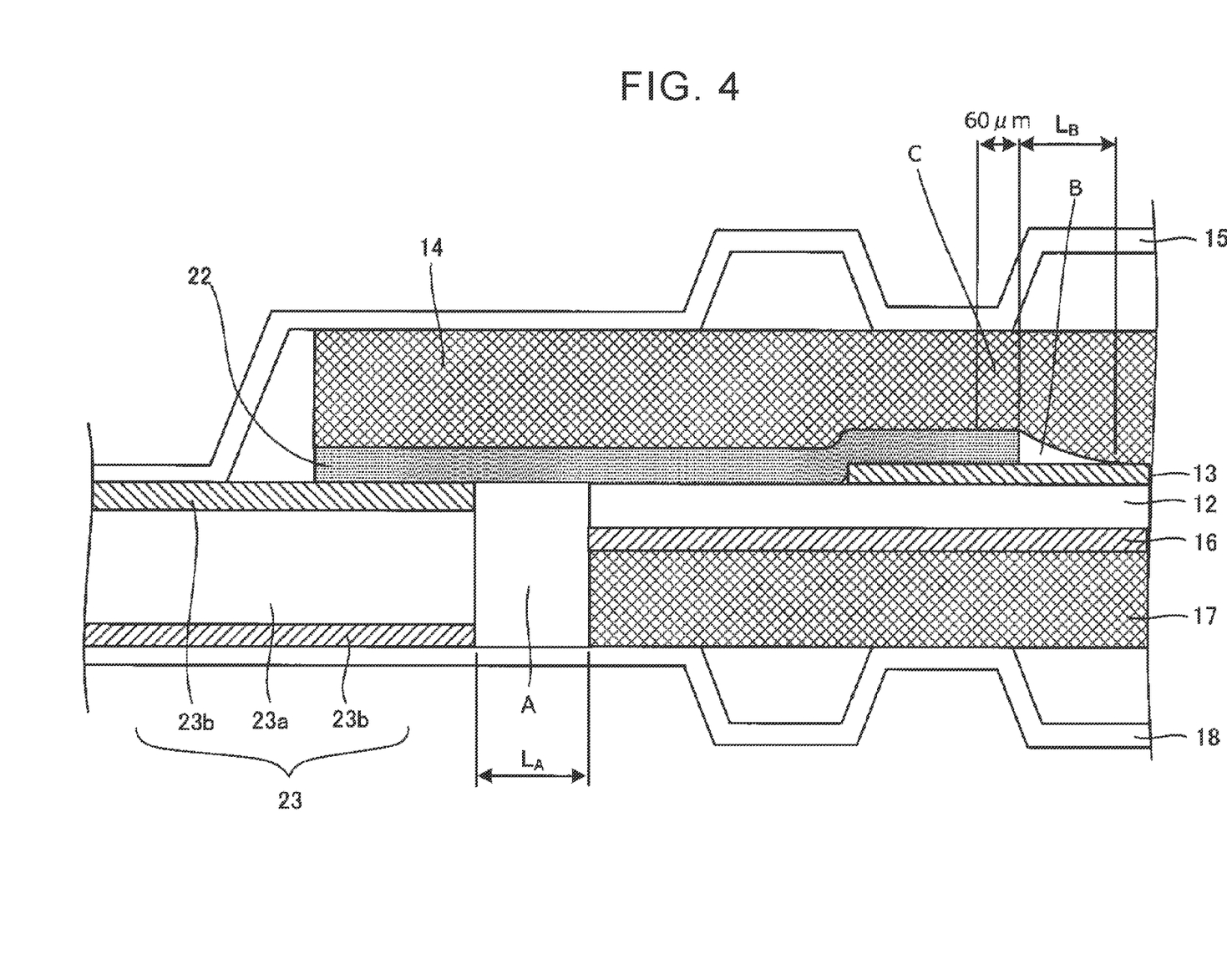
FIG. 4 is an enlarged view of a part of FIG. 3.

The outer peripheral portion 21 is a portion outside the power generation portion 11 shown enclosed by the dashed line in FIG. 1, and is an outer peripheral portion of the power generation unit cell 10. The outer peripheral portion 21 is composed of a stack of a plurality of layers, as shown by the layer configuration in the outer peripheral portion 21 in FIG. 3 (part of a section along line III-III in FIG. 1). FIG. 4 is an enlarged view of a part of FIG. 3.

1.2.1. Basic Structure of Outer Peripheral Portion

As can be seen from FIGS. 3 and 4, in the present embodiment, at least a part of the outer peripheral portion 21 has the following configuration. The electrolyte membrane 12, the anode catalyst layer 16, and the anode gas diffusion layer 17 are stacked such that their end faces are approximately aligned. The cathode catalyst layer 13 is stacked such that its end face is located at a position inward of (withdrawn from) an end face of the electrolyte membrane 12. An end face of the cathode gas diffusion layer 14 is located at a position outward of (advanced from) the end face of the electrolyte membrane 12. The cathode gas diffusion layer 14 extends to such a position that the cathode gas diffusion layer 14 overlaps a support 23 as viewed in plan of the power generation unit cell 10 (from a viewpoint in the direction of FIG. 1, a line of sight in the direction shown by arrow Z in FIG. 3). The support 23 will be described later.

In the outer peripheral portion 21 as well, the cathode separator 15 and the anode separator 18 are disposed so as to sandwich the layers described above therebetween as in the power generation portion 11. The cathode separator 15 and the anode separator 18 are extended so as to protrude beyond the end faces of the membrane electrode assembly, the cathode gas diffusion layer 14, and the anode gas diffusion layer 17. The support 23 is disposed between the extended portions of the cathode separator 15 and the anode separator 18. The cathode separator 15 and the anode separator 18 require no flow channels in the outer peripheral portion 21. Therefore, the cathode separator 15 and the anode separator 18 have no grooves 15a, 18a in the outer peripheral portion 21 (however, as can be seen from FIG. 3, the present disclosure does not exclude a configuration in which the cathode separator 15 and the anode separator 18 have the grooves 15a, 18a in a part of the outer peripheral portion 21).

A cover sheet 22 is disposed so as to connect an end portion of a cathode-side surface of the support 23 and an end portion of a cathode-side surface of the membrane electrode assembly. The cover sheet 22 will be described later.

1.2.2. Support

The support 23 functions as a sealing member that seals between the cathode separator 15 and the anode separator 18 in the outer peripheral portion 21 of the power generation unit cell 10. The support 23 includes a base material 23a and adhesive layers 23b located on both surfaces (cathode-side surface and anode-side surface) of the base material 23a. The adhesive layers 23b are bonded to the cathode separator 15 and the anode separator 18 to seal the power generation portion 11. The interval between the cathode separator 15 and the anode separator 18 therefore varies depending on the layers sandwiched therebetween. As can be seen from FIGS. 3 and 4, this interval is reduced in a part of a portion where only the support 23 is located between the cathode separator 15 and the anode separator 18. In this part, the support 23 is sandwiched and fixed between the cathode separator 15 and the anode separator 18.

The base material 23a is made of any electrically insulating, airtight material. Examples of such a material include crystalline polymers, more specifically, engineering plastics. Examples of engineering plastics include polyethylene naphthalate (PEN) resins and polyethylene terephthalate (PET) resins, polyphenyl ether (PPE), polyphenylsulfone (PPSU), polysulfone (PSU), polyethersulfone (PES), polyether ether ketone (PEEK), polyimide (PI), polyetherimide (PEI), polyamide-imide (PAI), polyphenyl sulfide (PPS), syndiotactic polystyrene (SPS), and nylon resins. The thickness of the base material 23a is preferably, but not particularly limited to, 0.05 mm or more and 0.25 mm or less.

Various materials can be used for the adhesive layers 23b as long as they exhibit adhesive properties in a bonded state. Examples of the adhesive material used for the adhesive layers 23b include polyolefin polymers containing maleic acid or maleic anhydride. A more specific example of the adhesive material is ADMER (registered trademark, Mitsui Chemicals, Inc.).

As can be seen from FIGS. 3 and 4, the support 23 is disposed such that an end face of the support 23 faces the end faces of the membrane electrode assembly and the anode gas diffusion layer 17 with a space A having a distance $L_A$ therebetween. The support 23 extends toward the opposite side from the power generation portion 11. This space A can absorb dimensional changes of the support 23, the membrane electrode assembly, etc. due to their linear expansion, and can reduce the possibility of damage due to expansion and contraction. More specifically, the distance $L_A$ of the space A in the direction in which the membrane electrode assembly and the anode gas diffusion layer 17 face the support 23 is preferably 0.01 mm or more and 2 mm or less. When the distance $L_A$ is less than 0.01 mm, it is difficult for the space A to absorb a dimensional change of the support 23. When the distance $L_A$ is larger than 2 mm, the differential pressure between the space A and the cathode gas diffusion layer 14 may cause deformation of or damage to the support 23, resulting in reduction in sealing performance.

1.2.3. Cover Sheet

As described above, the cover sheet 22 is disposed so as to connect the end portion of the cathode-side surface of the support 23 and the end portion of the cathode-side surface of the membrane electrode assembly.

One end portion of the cover sheet 22 is disposed so as to cover the end portion of the cathode-side surface of the support 23. The other end portion of the cover sheet 22 is disposed so as to cover an end portion of a surface of either or both of the electrolyte membrane 12 and the cathode catalyst layer 13 of the membrane electrode assembly. In the present embodiment, the cover sheet 22 is disposed so as to cover the end portions of the surfaces of both the electrolyte membrane 12 and the cathode catalyst layer 13. The cathode and the anode can thus be appropriately separated in the outer peripheral portion 21. Accordingly, the cover sheet 22 is located between the membrane electrode assembly and the cathode gas diffusion layer 14 in the end portion of the membrane electrode assembly.

A material impermeable to the reactive gases of the fuel cell is used for the cover sheet 22. Examples of a member impermeable to the reaction gases include film members made of resin such as polypropylene, polyphenylene sulfide, polyethylene naphthalate, nylon, or ethylene vinyl alcohol copolymer. Particularly, Nylon 11, Nylon 12, Nylon 9T, or ethylene vinyl alcohol can be used from the standpoint of hydrolysis resistance and adhesion to the electrolyte membrane 12. For example, an additive having an amide group, an epoxy group, a hydroxyl group, etc. may be added in order to improve adhesion to the electrolyte membrane 12.

An overlapping portion of the cover sheet 22 with the support 23 is bonded to the support 23 by the adhesive layer 23b of the support 23. An overlapping portion of the cover sheet 22 with the membrane electrode assembly is bonded to the membrane electrode assembly by an adhesive layer that is provided on the cover sheet 22 as necessary. However, when nylon is used as the cover sheet 22, the adhesive layer may be omitted as the cover sheet 22 and the membrane electrode assembly can be bonded together by thermocompression bonding.

When one end portion of the cover sheet 22 is disposed between the cathode gas diffusion layer 14 and the membrane electrode assembly, a space (space B) is formed in a portion shown by "B" in FIGS. 3 and 4 due to the thickness of the cover sheet 22. The thicker the cover sheet 22, the larger the space B tends to be.

1.2.4. Reduction in Damage

As a result of intensive research, the inventors found that, when the cover sheet 22 is placed, the cover sheet 22 and the anode gas diffusion layer 17 are damaged (torn) due to the spaces A, B, resulting in poor sealing. The inventors considered as follows on the findings.

The space A is necessary as a space for absorbing dimensional changes of the support 23 and other portions due to their thermal expansion. On the other hand, the space B is a space necessarily formed when the cover sheet 22 is placed, as described above. If the space B is too large, the cover sheet 22, the membrane electrode assembly, and the gas diffusion layers 14, 17 may be damaged. Since this damage may result in leakage of the reactive gases, it is preferable to make the space B as small as possible. One way to reduce the space B is to reduce the thickness of the cover sheet 22. However, when the thickness of the cover sheet 22 is reduced, the rigidity of the cover sheet 22 is also reduced. Therefore, due to the differential pressure between the space A and the cathode gas diffusion layer 14 with the cover sheet 22 sandwiched therebetween, the cover sheet 22 is more likely to be deformed, which may result in damage to the cover sheet 22. On the other hand, if the rigidity of the cover sheet 22 is increased too much by, for example, adjusting the material of the cover sheet 22, the cover sheet 22 is less likely to be deformed, resulting in reduction in sealing performance. In order to maintain sealing performance, the material of the cover sheet 22 needs to have certain flexibility. The inventors arrived at the conclusion that the problem can be solved by the structure in which the space B is reduced and sufficient sealing performance is ensured while reducing the possibility of damage to the cover sheet 22 due to the differential pressure. This will be specifically described below.

(1) Relationship Between Elastic Modulus and Thickness of Cover Sheet

The cover sheet 22 is configured so as to satisfy the following expression (1), where t (mm) is the thickness of the cover sheet, and E (MPa) is the elastic modulus of the cover sheet.

$$E > 0.048 \cdot L_A^4 / t^3 \quad (1)$$

As described above, $L_A$ (mm) is the distance of the space A in the direction in which the end face of the support 23 faces the end faces of the membrane electrode assembly and the anode gas diffusion layer 17 (see FIG. 4). When the cover sheet 22 satisfies the expression (1), the cover sheet 22 has predetermined flexibility and also rigidity. Therefore, the possibility of damage to the cover sheet 22 due to the differential pressure caused by the space A can be reduced, and sealing performance can be maintained.

As can be seen from FIG. 4, the relationship between the space A and the cover sheet 22 can be considered to be a uniformly distributed load on the cover sheet 22 supported at both ends over the distance $L_A$ (load is a surface pressure applied to the cover sheet 22 based on the differential pressure). Therefore, the following expression (2) representing a deflection δ can be applied.

$$\delta = (5 \cdot w \cdot L) / (384 \cdot E \cdot I) \quad (2)$$

In the expression (2), w is a load (surface pressure), L is $L_A$, and I is a section modulus ($I = t^3/12$), where t is the thickness of the cover sheet 22. The expression (1) was obtained by applying Test Example A2 in the test results shown below to the expression (2).

Figure 5:
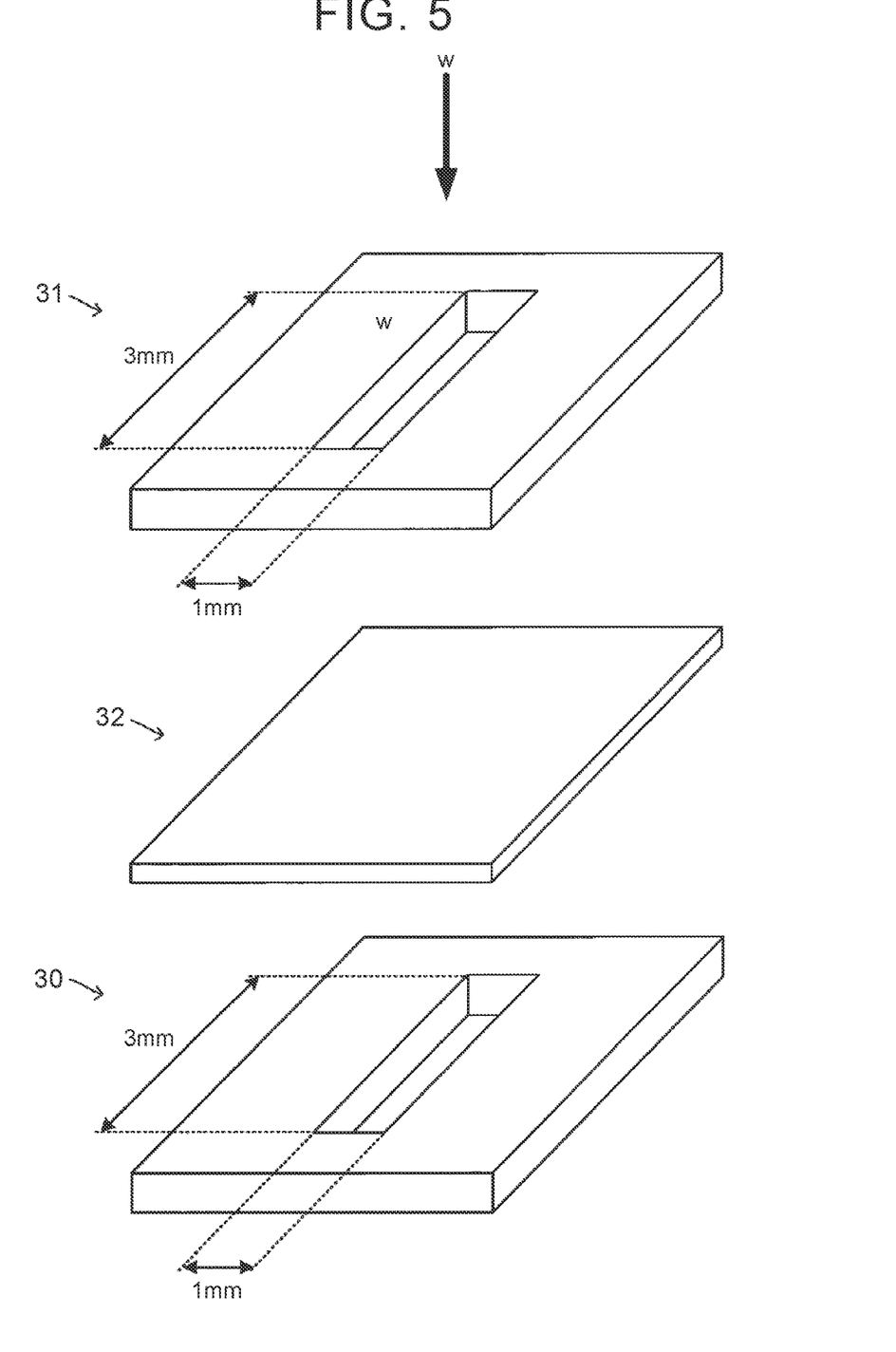
FIG. 5 illustrates a test method.

A part of tests will be described below. FIG. 5 is an exploded perspective view illustrating the test. A cover sheet 32 was sandwiched between a stainless steel base 30 with a 1 mm×3 mm slit and a foam rubber 31 with a 1 mm×3 mm slit so that a pressure would be applied to an area of 1 mm wide by 3 mm long in the cover sheet 32. A fatigue test was performed on the cover sheet 32 by repeatedly applying and releasing a gauge pressure of 0.07 MPa at a temperature of 120° C. from the slit of the foam rubber 31. Table 1 shows the cover sheets used and the results (number of repetitions performed without causing any leakage).

TABLE 1

| Test Example | Material | Elastic Modulus E (MPa) | Thickness T (μm) | Results (Times) |
|---|---|---|---|---|
| A1 | Ethylene-Vinyl Alcohol Copolymer (EVOH) Resin | 16 | 40 | 1500 |
| A2 | Nylon 12 (Flexible Grade) | 75 | 40 | 52000 |
| B1 | Nylon 12 | 160 | 60 | >300,000 |
| B2 | Nylon 12 | 160 | 40 | >300,000 |
| B3 | Nylon 12 containing 10 mass % of ADMER (registered trademark) | 137 | 100 | >300,000 |
| B4 | Nylon 12 containing 10 mass % of ADMER (registered trademark) | 137 | 90 | >300,000 |
| B5 | Nylon 12 containing 10 mass % of ADMER (registered trademark) | 137 | 60 | >300,000 |
| B6 | Nylon 12 containing 10 mass % of ADMER (registered trademark) | 137 | 40 | >300,000 |

Figure 6:
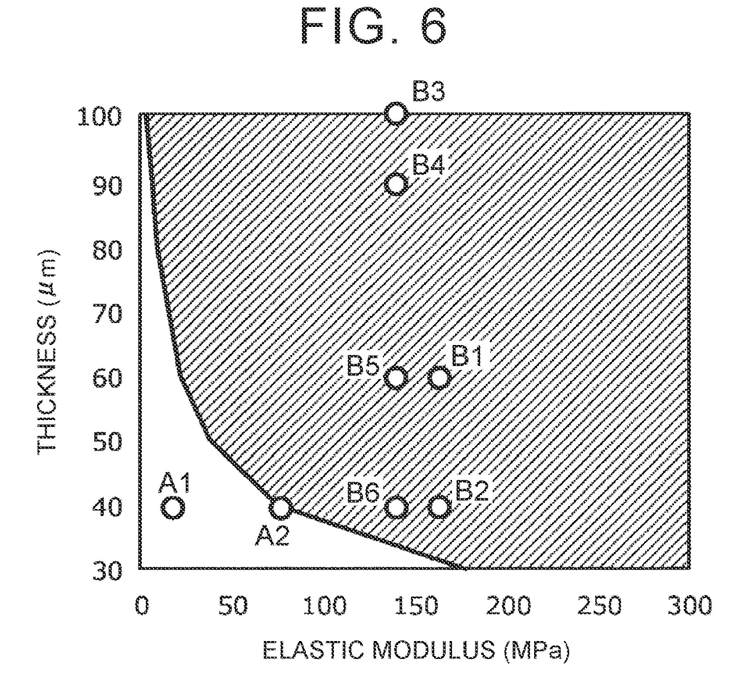
FIG. 6 illustrates test results.

FIG. 6 is a graph showing the range of the expression (1) (hatched area) and the positions of Test Examples A1, A2, and B1 to B6. In FIG. 6, the abscissa represents the elastic modulus, and the ordinate represents the thickness of the cover sheet 32. As can be seen from Table 1 and FIG. 6, leakage occurred after a small number of repetitions in Test Examples A1 and A2 that do not satisfy the expression (1), while no leakage occurred even after over 300,000 repetitions in Test Examples B1 to B6 that satisfy the expression (1).

(2) Squashing of Gas Diffusion Layer

The reduction rate of voids in the gas diffusion layer in a portion where the cover sheet 22 is located as indicated by C (portion C) in FIGS. 3 and 4 with respect to voids in the gas diffusion layer in the power generation portion 11 (portion where the cover sheet 22 is not located) is 5% or more and 25% or less. By squashing the first gas diffusion layer 14 so as to reduce the thickness of the first gas diffusion layer 14 in the portion where the cover sheet 22 is located, the space B can be reduced, and the sealing performance of the cover sheet 22 can be maintained. The portion C means an overlapping portion of the first gas diffusion layer (cathode gas diffusion layer) 14 with a portion of the cover sheet 22 in the range of 60 μm from the edge on the membrane electrode assembly side of the cover sheet 22 as viewed in plan of the power generation unit cell 10.

In order to supply gases to the power generation portion 11 as described above, the cathode gas diffusion layer 14 and the anode gas diffusion layer 17 (sometimes simply referred to as "gas diffusion layers" when there is no particular need to distinguish between them) have voids for gas to pass therethrough. Since such voids are not necessary in the outer peripheral portion 21 where the cover sheet 22 is placed, it is possible to squash the voids in the outer peripheral portion 21. However, if the void reduction rate is less than 5%, the effect of reducing the space B tends to be reduced. If the void reduction rate is higher than 25%, the gas diffusion layer becomes thin and may buckle.

Figure 7:
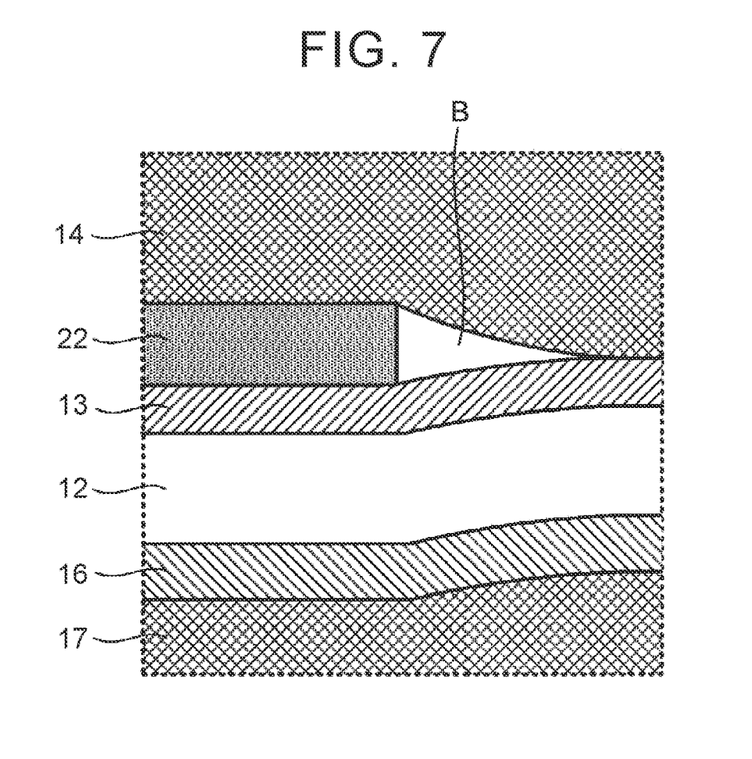
FIG. 7 illustrates another form.

The present embodiment illustrates an example in which the cathode gas diffusion layer 14 is the only gas diffusion layer that is squashed. However, the present disclosure is not limited to this, and both the cathode gas diffusion layer 14 and the anode gas diffusion layer 17 may be squashed. When both the cathode gas diffusion layer 14 and the anode gas diffusion layer 17 are squashed, the portion around the space B is in such a form as shown in FIG. 7. Even when both gas diffusion layers are squashed, the void reduction rate of each gas diffusion layer is 5% or more and 25% or less.

A part (Tests D and E) of tests in which the space B is reduced by squashing the gas diffusion layer in the portion C will be described below. Membrane electrode assemblies composed of a 10 μm-thick perfluoro electrolyte membrane as the electrolyte membrane 12, 10 μm-thick platinum-supported carbon as the cathode catalyst layer 13, and 5 μm-thick platinum-supported carbon as the anode catalyst layer 16 were used in Tests D, E. Nylon 12 (containing 10 μmass % of ADMER (registered trademark)) was used as the cover sheet 22 (thickness is shown in Table 2). The thicknesses and reduction rates of voids (void reduction rates) of the cathode gas diffusion layer 14 and the anode gas diffusion layer 17 are shown in Table 2.

Test D

Each gas diffusion layer was 3 cm long by 1 cm wide, and a cover sheet of 1.5 cm long by 1 cm wide was sandwiched between the two gas diffusion layers. The size ($L_B$ in FIG. 4) of the space B and the amount by which the gas diffusion layer was squashed when a surface pressure of 0.6 MPa was applied were observed and measured with a microscope. Table 2 shows the results. The void reduction rate $R_S$ was calculated by the following expression, where $t_H$ is the thickness of the gas diffusion layer in the portion where the cover sheet is not located, and $t_C$ is the thickness of the gas diffusion layer in the portion C.

$$R_S(\%)=(t_H-t_C)/t_H\times100(\%)$$

Test E

Each gas diffusion layer was 3 cm long by 1 cm wide, and a cover sheet of 1.5 cm long by 1 cm wide was sandwiched between the two gas diffusion layers. The size ($L_B$ in FIG. 4) of the space B and the amount by which the gas diffusion layer was squashed when a surface pressure of 0.1 MPa was applied were observed and measured with a microscope. $R_S$ was calculated by the same method as in Test D. Table 2 shows the results.

TABLE 2

| Test Example | Cover Sheet Thickness (μm) | Cathode Gas Diffusion Layer | | | Anode Gas Diffusion Layer | | | $L_B$ |
|---|---|---|---|---|---|---|---|---|
| | | $t_H$ (μm) | $t_C$ (μm) | $R_S$ (%) | $t_H$ (μm) | $t_C$ (μm) | $R_S$ (%) | |
| D1 | 60 | 175 | 150 | 14 | 185 | 165 | 11 | <100 μm |
| D2 | 40 | 180 | 160 | 11 | 190 | 175 | 8 | <100 μm |
| E1 | 60 | 190 | 185 | 3 | 200 | 195 | 3 | >1 mm |
| E2 | 40 | 195 | 190 | 3 | 195 | 190 | 3 | >1 mm |

As can be seen from Table 2, the size of the space B is reduced by squashing the gas diffusion layer so that the void reduction rate in the portion C is 5% or more. Since the stress applied to the electrolyte membrane is thus reduced, the sealing performance of the cover sheet is improved.

1.2.5. Another Embodiment

Figure 8:
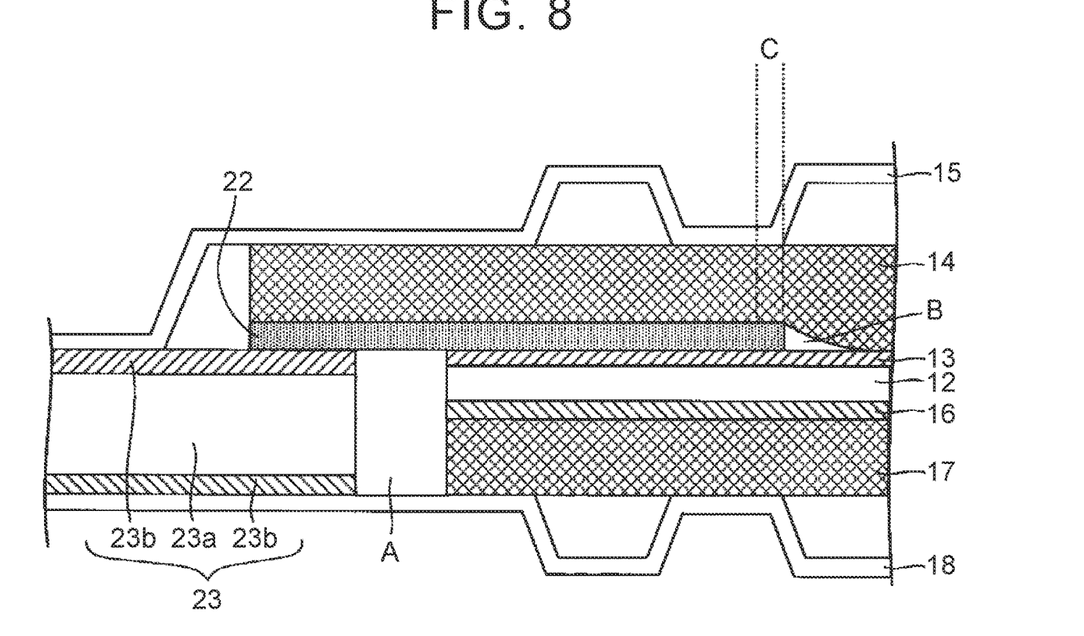
FIG. 8 illustrates another embodiment.

FIG. 8 illustrates another example of the form of the outer peripheral portion 21. FIG. 8 shows a view from the same viewpoint as in FIG. 4. In the example of FIG. 8, the end face of the cathode catalyst layer 13 is also aligned with the end face of the electrolyte membrane 12. In this case, the cover sheet 22 is not stacked on the electrolyte membrane 12 but is stacked on the cathode catalyst layer 13. Even in such a form, effects similar to those described above can be obtained when each of the relationship between the elastic modulus and thickness of the cover sheet and the void reduction rates of the cathode gas diffusion layer 14 and the anode gas diffusion layer 17 in the portion (portion C) where the cover sheet 22 overlaps the cathode catalyst layer 13 as viewed in plan falls within the above predetermined range.

2. Effects

As described above, as measures against damage (tear) of the cover sheet or poor sealing that is caused by the spaces A, B when the cover sheet is placed, the elastic modulus and thickness of the cover sheet have the above predetermined relationship. In addition, voids in the gas diffusion layer in the portion where the cover sheet is located are squashed so that the void reduction rate of the gas diffusion layer falls within the above predetermined range. These measures can reduce the influences of the spaces A, B, so that the possibility of damage to the membrane electrode assembly and the cathode gas diffusion layer can be reduced, and the possibility of leakage of reactive gases due to the damage can be reduced.

3. Fuel Cell

A fuel cell 40 is formed by stacking a plurality of (around 50 to 400) power generation unit cells 10 described above.

Figure 9:
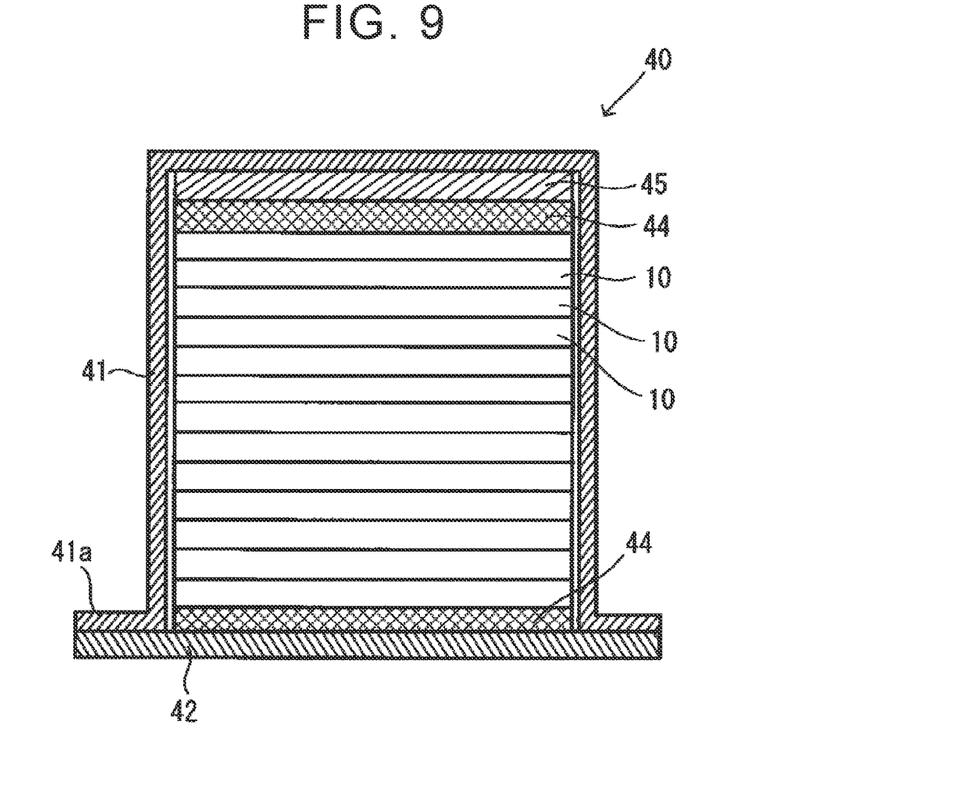
FIG. 9 illustrates a fuel cell 40.

The fuel cell 40 collects a current from the power generation unit cells 10. FIG. 9 shows an overview of the configuration of the fuel cell 40. The fuel cell 40 includes a stack case 41, an end plate 42, a plurality of power generation unit cells 10, a current collector plate 44, and a biasing member 45.

The stack case 41 is a housing that houses a stack of the power generation unit cells 10, the current collector plate 44, and the biasing member 45 therein. In the present embodiment, the stack case 41 is in the shape of a rectangular prism that is open at one end and closed at the other end, with a plate-like piece extending along the edge of the opening and protruding toward the opposite side from the opening to form a flange 41a.

The end plate 42 is a plate member that closes the opening of the stack case 41. An overlapping portion of the end plate 42 with the flange 41a of the stack case 41 is fixed to the flange 41a by bolts and nuts etc. so that the end plate 42 closes the stack case 41.

The power generation unit cell 10 is as described above. A plurality of such power generation unit cells 10 is stacked on top of each other. The power generation unit cells 10 are stacked such that the cathode separator 15 of one power generation unit cell 10 is located under the anode separator 18 of the power generation unit cell 10 adjacent to the one power generation unit cell 10. The grooves 15b of the cathode separator 15 and the grooves 18b of the anode separator 18 thus face each other to form coolant channels.

The current collector plate 44 is a member that collects a current from the stack of the power generation unit cells 10. Accordingly, the current collector plate 44 is placed at one end and the other end in the stacking direction of the stack of the power generation unit cells 10. One of the current collector plates 44 serves as a positive electrode, and the other current collector plate 44 serves as a negative electrode. Terminals, not shown, are connected to the current collector plates 44, so that the current collector plates 44 can be electrically connected to the outside.

The biasing member 45 fits inside the stack case 41, and applies a pressing force to the stack of the power generation unit cells 10 in the stacking direction thereof. An example of the biasing member is a disc spring.

As an operating condition of the fuel cell during its power generation, it is desirable to operate the fuel cell at higher temperatures during its power generation because the fuel cell generates heat when in operation. Specifically, it is preferable that the fuel cell be operable at up to 140° C. However, since some perfluoro electrolyte membranes that are used soften at around 120° C., it is more preferable to operate the fuel cell at 120° C. or less.

4. Manufacturing of Fuel Cell

The fuel cell of the present disclosure can be manufactured by, for example, a process including the following steps.

Figure 10:
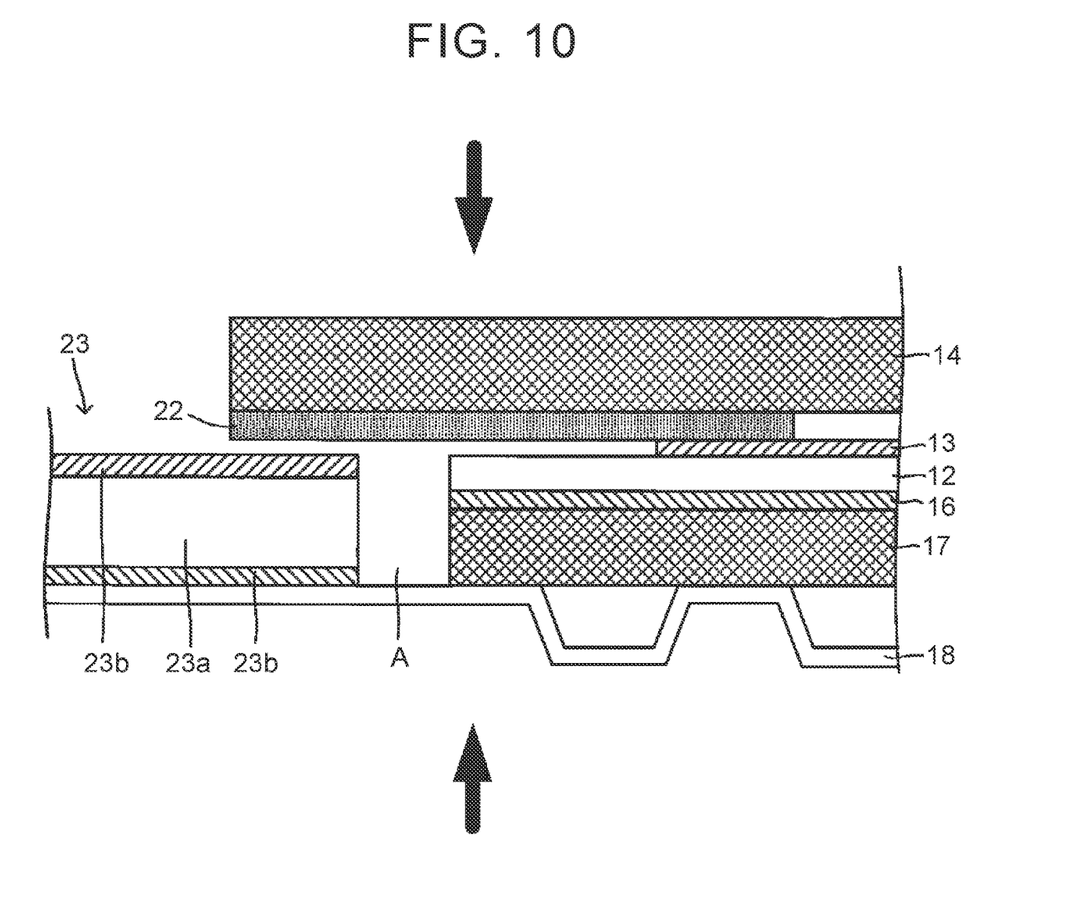
FIG. 10 illustrates a part of a process of manufacturing a fuel cell.

First, as shown in FIG. 10, such a cover sheet 22 that the relationship between the elastic modulus and thickness thereof satisfies the above expression (1) is placed over the membrane electrode assembly and the support 23 on the anode separator 18 so as to connect the support 23 and either or both of the electrolyte membrane 12 and the cathode catalyst layer 13. The membrane electrode assembly includes the cathode catalyst layer 13, the anode catalyst layer 16, and the electrolyte membrane 12 located between the cathode catalyst layer 13 and the anode catalyst layer 16. The support 23 is located around the membrane electrode assembly with the space A between the support 23 and the end face of the membrane electrode assembly.

Next, the cathode gas diffusion layer 14 is placed on the cover sheet 22, and is pressed so that the reduction rate of voids in the portion C with respect to voids in the gas diffusion layer in the power generation portion 11 is 5% or more and 25% or less. It is preferable to obtain the relationship between the pressing force and the void reduction rate in advance so that it is not necessary to measure the void reduction rate each time.

Then, the cathode separator 15 is stacked on the cathode gas diffusion layer 14 and pressed. The power generation unit cell 10 are thus stacked, and each member is disposed as shown in FIG. 9. The fuel cell 40 can thus be manufactured.

5. Others

In the above description, the term "first" is used to refer to each member on the cathode side, and the term "second" is used to refer to each member on the anode side. However, this may be opposite. The same effects can be obtained even when the term "second" is used for the cathode side and the term "first" is used for the anode side.

What is claimed is:

1. A fuel cell comprising:
   a membrane electrode assembly including a first catalyst layer, a second catalyst layer, and an electrolyte membrane located between the first catalyst layer and the second catalyst layer;
   a first gas diffusion layer located on the first catalyst layer, at least a part of an outer peripheral end portion of the first gas diffusion layer protruding beyond an outer peripheral edge of the membrane electrode assembly;
   a second gas diffusion layer located on the second catalyst layer;
   a support located around the membrane electrode assembly; and
   a cover sheet located so as to connect either or both of the electrolyte membrane and the first catalyst layer and the support, wherein
   there is a space having a distance $L_A$ between an end face of the support and an end face of the membrane electrode assembly,
   the following expression is satisfied, $$E > 0.048 \times L_A^4 / t^3$$

where E is an elastic modulus of the cover sheet, and t is a thickness of the cover sheet, and
   a reduction rate of voids in at least a part of a portion of the first gas diffusion layer under which the cover sheet is located with respect to voids in a portion of the first gas diffusion layer under which the cover sheet is not located is 5% or more and 25% or less.

2. The fuel cell according to claim 1, further comprising a set of separators sandwiching the first gas diffusion layer, the membrane electrode assembly, and the second gas diffusion layer, wherein
   the support seals between the set of separators.

3. A method for manufacturing a fuel cell, the method comprising:
   placing a cover sheet on a membrane electrode assembly and a support; and
   placing a first gas diffusion layer on the cover sheet and the membrane electrode assembly, wherein the membrane electrode assembly includes a first catalyst layer, a second catalyst layer, and an electrolyte membrane located between the first catalyst layer and the second catalyst layer, the support is located around the membrane electrode assembly, and a space having a distance $L_A$ is provided between the support and an end face of the membrane electrode assembly, the following expression is satisfied $$E > 0.048 \times L_A^4/t^3$$

where E is an elastic modulus of the cover sheet, and t is a thickness of the cover sheet, when placing the cover sheet on the membrane electrode assembly and the support, the cover sheet is placed so as to connect either or both of the electrolyte membrane and the first catalyst layer and the support, and when placing the first gas diffusion layer on the cover sheet and the membrane electrode assembly, the first gas diffusion layer is pressed in such a manner that a reduction rate of voids in at least a part of a portion of the first gas diffusion layer under which the cover sheet is located with respect to voids in a portion of the first gas diffusion layer under which the cover sheet is not located is 5% or more and 25% or less.

* * * * *